(12) United States Patent
Capuano et al.

(10) Patent No.: US 11,733,399 B2
(45) Date of Patent: Aug. 22, 2023

(54) SYSTEMS AND METHODS FOR ROBUST AND ACCURATE RELATIVE NAVIGATION

(71) Applicant: California Institute of Technology, Pasadena, CA (US)

(72) Inventors: Vincenzo Capuano, Glendale, CA (US); Alexei Harvard, Pasadena, CA (US); Soon-Jo Chung, La Cañada Flintridge, CA (US)

(73) Assignee: California Institute of Technology, Pasadena, CA (US)

( * ) Notice: Subject to any disclaimer, the term of this patent is extended or adjusted under 35 U.S.C. 154(b) by 437 days.

(21) Appl. No.: 16/995,652

(22) Filed: Aug. 17, 2020

(65) Prior Publication Data
US 2021/0048542 A1 Feb. 18, 2021

Related U.S. Application Data

(60) Provisional application No. 62/887,924, filed on Aug. 16, 2019.

(51) Int. Cl.
*G01S 19/51* (2010.01)
*G01S 19/25* (2010.01)
*G01S 19/48* (2010.01)

(52) U.S. Cl.
CPC .............. *G01S 19/51* (2013.01); *G01S 19/25* (2013.01); *G01S 19/485* (2020.05)

(58) Field of Classification Search
CPC ......... G01S 19/51; G01S 19/485; G01S 19/25
USPC .... 342/352, 357.27, 357.29, 357.34, 357.44, 342/357.77
See application file for complete search history.

(56) References Cited

U.S. PATENT DOCUMENTS

2002/0021241 A1* 2/2002 Zhodzishky ............ G01S 19/44
342/357.27

OTHER PUBLICATIONS

Blender, Retrieved from: www.blender.org on Jun. 26, 2019, 20 pgs.
"Intelsat 904", SATBEAMS, Retrieved from: https://www.satbeams.com/satellites?id=2223 on Jun. 25, 2019, 2 pgs.
"Navstar GPS Space Segment/Navigation User Interfaces", Global Positioning Systems Directorate Systems Engineering & Integration, IS-GPS-200H, Sep. 24, 2013, 226 pgs.
"Navstar GPS Space Segment/User Segment L5 Interfaces", Global Positioning Systems Directorate Systems Engineering & Integration, IS-GPS-705C, Sep. 5, 2012, 104 pgs.
"Welcome to Systems Tool Kit 12", STK Help, Retrieved from: https://help.agi.com/stk/index.htm on Jun. 25, 2019, 1 pg.
Barreau et al., "A New Approach for Deep Integration of GNSS and Vision-Aided MEMS IMU", 23rd International Technical Meeting of the Satellite Division of the Institute of Navigation, Portland, Oregon, Sep. 21-24, 2010, pp. 464-475.

(Continued)

*Primary Examiner* — Bo Fan
(74) *Attorney, Agent, or Firm* — KPPB LLP

(57) ABSTRACT

A system and method for determining the relative position of a mobile device in relation to other devices or objects in an operational space. The systems and methods operate on a tight fusion of raw data from a number of different sensors such that carrier spaced integer ambiguities can be quickly and accurately resolved, especially in GNSS signal degradation scenarios.

18 Claims, 16 Drawing Sheets

(56) References Cited

OTHER PUBLICATIONS

Blunt et al., "Ultra-high sensitivity state-of-the-art receiver for space applications", In the 2016 8th ESA Workshop on Satellite Navigation Technologies and European Workshop on GNSS Signals and Signal Processing (NAVITEC), Netherlands, ESA, Dec. 2016, 8 pgs.

Capuano, "GNSS-Based Navigation for Lunar Missions", EPFL, Technical Report, 2016, 194 pgs.

Capuano et al., "A Highly Integrated Navigation Unit for On-Orbit Servicing Missions", 69th International Astronautical Congress (IAC), Bremen, Germany, Oct. 1-5, 2018, 13 pgs.

Capuano et al., "An adaptive GNSS-based reduced dynamic approach for real time autonomous navigation from the Earth to the Moon", Pacific PNT, Honolulu, Hawaii, May 1-4, 2017, 17 pgs.

Capuano et al., "Availability and ranging error analysis for a GPS L1/L5 receiver navigating to the Moon", 2017 European Navigation Conference (ENC), Lausanne, Switzerland, May 9-12, 2017, pp. 348-358.

Capuano et al., "Feasibility study of GNSS as navigation system to reach the Moon", Acta Astronautica, Nov.-Dec. 2015, vol. 116, pp. 186-201, http://dx.doi.org/10.1016/j.actaastro.2015.06.007.

Capuano et al., "GNSS Performances for MEO, GEO and HEO", 64th International Astronautical Congress, Beijing, China, Oct. 23-27, 2013, Space Communications and Navigation Symposium—Space-Based Navigation Systems and Services, 15 pgs.

Capuano et al., "High accuracy GNSS based navigation in GEO", Acta Astronautica, vol. 136, Jul. 2017, pp. 332-341.

Capuano et al., "Monocular-Based Pose Determination of Uncooperative Known and Unknown Space Objects", 69th International Astronautical Congress (IAC), Bremen, Germany, Oct. 1-5, 2018, 16 pgs.

Capuano et al., "Orbital Filter Aiding of a High Sensitivity GPS Receiver for Lunar Missions", Navigation: Journal of the Institute of Navigation, vol. 64, No. 3, Jun. 5, 2017, pp. 323-338.

D'Amico et al., "Differential GPS: An Enabling Technology for Formation Flying Satellites", Small Satellite Missions for Earth Observation, Nov. 28, 2009, pp. 457-465, DOI: 10.1007/978-3-642-03501-2_43.

De Jonge et al., "The LAMBDA Methods for Integer Ambiguity Estimation: Implementation Aspects", Publications of the Delft Geodetic Computing Centre, LGR-Series, No. 12, Aug. 1996, 59 pgs.

Dellaert et al., "Factor Graphs for Robot Perception", Foundations and Trends® in Robotics, vol. 6, No. 1-2, Aug. 2017, 144 pgs.

Engel, "Improving Position Accuracy by Combined Processing of Galileo and GPS Satellite Signals", Proceedings of the 11th International Conference on Information Fusion, Cologne, Germany, Jun. 30-Jul. 3, 2008, pp. 2003-2010.

Garcia, "Aura", NASA 3D Resources, Apr. 11, 2010, Retrieved from: https://nasa3d.arc.nasa.gov/detail/aura-eoe3d, 1 pg.

Gurfil, "Relative Motion Between Elliptic Orbits: Generalized Boundedness Conditions and Optimal Formationkeeping", Journal of Guidance, Control, and Dynamics, vol. 28, No. 4, Jul.-Aug. 2005, pp. 761-767.

Hwu et al., "Space Station GPS Multipath Analysis and Validation", Proceedings of the IEEE 49th Vehicular Technology Conference (Cat. No. 99CH36363), Houston, Texas, May 16-20, 1999, 5 pgs.

Kaess et al., "iSAM2: Incremental Smoothing and Mapping Using the Bayes Tree", International Journal of Robotics Research, vol. 31, No. 2, Feb. 2012, pp. 217-236.

Kalman, "A New Approach to Linear Filtering and Prediction Problems", Transactions of the ASME—Journal of Basic Engineering, 1960; vol. 82, (Series D), pp. 35-45.

Kroes, "Precise Relative Positioning of Formation Flying Spacecraft using GPS", Publications on Geodesy 61, Netherlands Geodetic Commission, Mar. 2006, 184 pgs.

Lee, "On-The-Fly Carrier Phase Ambiguity Resolution Without Using Pseudorange Measurements for Satellite-Based Differential Positioning", Thesis to the Faculty of the Russ College of Engineering and Technology, Ohio University, Nov. 1994, 124 pgs. (presented in two parts).

Magnusson, "Antenna for GNSS reception in GEO-orbit", Master of Science Thesis, KTH Electrical Engineering, Stockholm, Sweden, 2014, 99 pgs.

Mohiuddin et al., "High-Altitude Satellite Relative Navigation Using Carrier-Phase Differential Global Positioning System Techniques", Journal of Guidance, Control, and Dynamics, Sep.-Oct. 2007, vol. 30, No. 5, pp. 1427-1436, DOI: 10.2514/1.27827.

Myronenko et al., "Point Set Registration: Coherent Point Drift", IEEE Transactions on Pattern Analysis and Machine Intelligence, Dec. 2010, vol. 32, No. 12, pp. 2262-2275, published online Feb. 25, 2010, DOI: 10.1109/TPAMI.2010.46.

Pesyna JR., "Advanced Techniques for Centimeter-Accurate GNSS Positioning on Low-Cost Mobile Platforms", PhD Dissertation, The University of Texas at Austin, Dec. 2015, 213 pgs.

Priot et al., "Performance Assessment of an Ultra-Tightly Coupled Vision-Aided INS/GNSS Navigation System", Proceedings of the International Technical Meeting of the Institute of Navigation, San Diego, CA, Jan. 24-26, 2011, pp. 652-661.

Psiaki et al., "Modeling, Analysis, and Simulation of GPS Carrier Phase for Spacecraft Relative Navigation", Journal of Guidance, Control, and Dynamics, Nov.-Dec. 2007, vol. 30, No. 6, pp. 1628-1639, DOI: 10.2514/1.29534.

Psiaki et al., "Relative Navigation of High-Altitude Spacecraft Using Dual-Frequency Civilian CDGPS", Proceedings of the 18th International Technical Meeting of the Satellite Division of the Institute of Navigation, Long Beach, CA, Sep. 13-16, 2005, 17 pgs.

Reichert et al., "Toward Decimeter-Level Real-Time Orbit Determination: A Demonstration Using the SAC-C and CHAMP Spacecraft", Proceedings of the 15th International Technical Meeting of the Satellite Division of the Institute of Navigation, Portland, OR, Sep. 24-27, 2002, 8 pgs.

Segal et al., "Effect of Kinematic Rotation-Translation Coupling on Relative Spacecraft Translational Dynamics", Journal of Guidance, Control, and Dynamics, May-Jun. 2009, vol. 32, No. 3, pp. 1045-1050, DOI: 10.2514/1.39320.

Shehaj et al., "GPS Based Navigation Performance Analysis within and beyond the Space Service Volume for Different Transmitters' Antenna Patterns", Aerospace, vol. 4, No. 3, Aug. 15, 2017, 34 pgs.

Teunissen, "Theory of Carrier Phase Ambiguity Resolution", Wuhan University Journal of Natural Sciences, vol. 8, No. 2B, 2003, pp. 471-484.

Won et al., "GNSS integration with vision-based navigation for low GNSS visibility conditions", GPS Solutions, Mar. 15, 2013, vol. 18, No. 2, pp. 177-187, DOI: 10.1007/s10291-013-0318-8.

Wu et al., "PnP Problem Revisited", Journal of Mathematical Imaging and Vision, vol. 24, No. 1, Dec. 7, 2005, pp. 131-141.

Wu et al., "Real-Time Sub-cm Differential Orbit Determination of Two Low-Earth Orbiters with GPS Bias Fixing", Proceedings of the 19th International Technical Meeting of the Satellite Division of the Institute of Navigation, Fort Worth, TX, Sep. 26-29, 2006, 8 pgs.

Yakimov, "CubeSat U2", GrabCad Community, May 24, 2015, Retrieved from: https://grabcad.com/library/cubesat-u2-1, 3 pgs.

Yamanaka et al., "New State Transition Matrix for Relative Motion on an Arbitrary Elliptical Orbit", Journal of Guidance, Control, and Dynamics, Jan.-Feb. 2002, vol. 25, No. 1, pp. 60-66.

\* cited by examiner

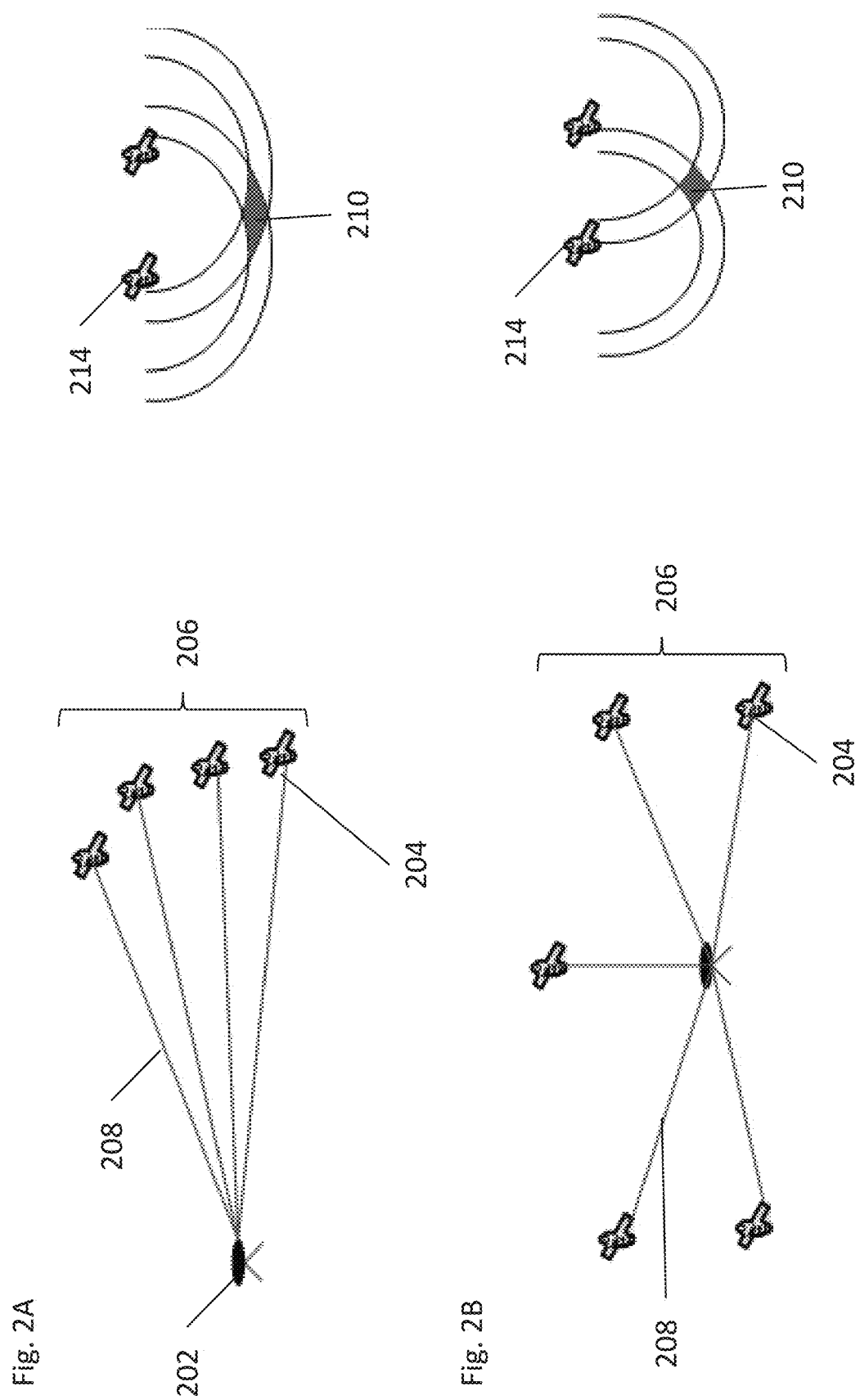

| Processed Signals | GPS L1 C/A, GPS L5 |
|---|---|
| Acquisition and Tracking Sensitivity | 20dB-Hz |
| L1 C/A Acquisition and Synchronization time | 5 min |
| Initial Clock Offset | 10km |
| Initial Clock Drift | 100m/s |

Fig. 3

| Ionosphere Crossing | Navigation Module | Signals | Observations |
|---|---|---|---|
| Not | Absolute | GPS L5Q | Code-based |
| Yes | Absolute | GPS L1 C/A and L5Q | Code-based |
| Not | Relative | GPS L1 C/A | Iono-free Combination carrier Phase and code double differences |
| Yes | Relative | GPS L1 C/A | Carrier Phase and code double differences |

| $\sigma_0(m)$ | 0.001 | 0.003 | 0.005 | 0.0075 | 0.01 | 0.0125 | 0.015 | 0.02 | 0.025 | 0.03 | 0.035 | 0.04 |
|---|---|---|---|---|---|---|---|---|---|---|---|---|
| GNSS only (%) | 3.3 | 1.0 | 0.03 | 0 | 0.1 | 0.1 | 0.1 | 0.1 | 0 | 0 | 0 | 0 |
| GNSS + vision | 100.00 | 100.0 | 99.9 | 99.2 | 96.7 | 89.5 | 81.4 | 63.1 | 54.1 | 49.6 | 48.2 | 46.7 |

Fig. 12

| GNSS Satellites (#): | | 4 | 5 | 6 | 10 | 15 | 20 | 25 | All |
|---|---|---|---|---|---|---|---|---|---|
| GNSS only (%): | Batch size 1 | 0.0 | 0.0 | 0.2 | 4.2 | 38.1 | 87.4 | 98.0 | 98.0 |
| | Batch size 2 | 0.0 | 0.0 | 0.4 | 21.4 | 90.8 | 99.8 | 100.0 | 100.0 |
| | Batch size 3 | 0.0 | 0.4 | 1.0 | 45.3 | 98.4 | 100.0 | 100.0 | 100.0 |
| | Batch size 4 | 0.0 | 0.4 | 1.2 | 64.9 | 99.8 | 99.8 | 100.0 | 100.0 |
| GNSS + vision (%): | Batch size 1 | 83.8 | 88.2 | 90.6 | 99.8 | 100.0 | 100.0 | 100.0 | 100.0 |
| | Batch size 2 | 98.4 | 99.4 | 99.6 | 100.0 | 100.0 | 100.0 | 100.0 | 100.0 |
| | Batch size 3 | 100.0 | 100.0 | 100.0 | 100.0 | 100.0 | 100.0 | 100.0 | 100.0 |

| Satellites (#): | 4 | 5 | 6 | 10 | 15 | 20 | 25 | All |
|---|---|---|---|---|---|---|---|---|
| GNSS only (m): | — | — | — | 0.047 | 0.033 | 0.027 | 0.026 | 0.026 |
| GNSS-vision (m): 6° | 0.010 | 0.008 | 0.008 | 0.007 | 0.007 | 0.006 | 0.006 | 0.005 |
| 10° | 0.010 | 0.010 | 0.010 | 0.008 | 0.008 | 0.007 | 0.006 | 0.006 |
| 20° | 0.014 | 0.012 | 0.012 | 0.009 | 0.008 | 0.007 | 0.006 | 0.006 |
| 35° | 0.015 | 0.013 | 0.012 | 0.009 | 0.008 | 0.007 | 0.006 | 0.006 |
| 90° | 0.015 | 0.013 | 0.012 | 0.009 | 0.008 | 0.006 | 0.005 | 0.005 |
| 120° | 0.015 | 0.013 | 0.012 | 0.009 | 0.008 | 0.007 | 0.006 | 0.006 |

| FOV | 6° | 10° | 20° | 35° | 90° | 120° |
|---|---|---|---|---|---|---|
| Vision only (m): | 0.011 | 0.018 | 0.035 | 0.064 | 0.205 | 0.345 |

| GNSS-only/GNSS-vision (s) Satellites (#): | 2 | 3 | 4 | 5 | 6 | 10 | 15 | 20 |
|---|---|---|---|---|---|---|---|---|
| $\sigma_\phi(m)$ | | | | | | | | |
| 0.001 | --/5.9 | --/1.1 | 149.4/1.0 | 77.6/1.0 | 15.6/1.0 | 1.0/1.0 | 1.0/1.0 | 1.0/1.0 |
| 0.003 | --/6.1 | --/1.1 | 149.4/1.0 | 81.1/1.0 | 36.1/1.0 | 1.4/1.0 | 1.0/1.0 | 1.0/1.0 |
| 0.005 | --/5.9 | --/1.1 | 149.7/1.0 | 89.1/1.0 | 40.4/1.0 | 2.2/1.0 | 1.0/1.0 | 1.0/1.0 |
| 0.0075 | --/6.9 | --/2.1 | 149.7/1.0 | 91.1/1.0 | 69.8/1.0 | 3.7/1.0 | 1.3/1.0 | 1.0/1.0 |
| 0.010 | --/6.1 | --/3.6 | 149.7/1.1 | 130.1/1.1 | 83.8/1.0 | 5.4/1.0 | 1.6/1.0 | 1.0/1.0 |
| 0.0125 | --/6.6 | --/4.9 | 149.7/1.3 | 139.7/1.2 | 63.0/1.0 | 7.6/1.0 | 2.1/1.0 | 1.0/1.0 |
| 0.015 | --/6.6 | --/4.9 | 149.8/1.7 | 142.7/1.6 | 73.1/1.3 | 9.3/1.1 | 2.8/1.0 | 1.7/1.0 |
| 0.020 | --/6.6 | --/5.6 | 150.5/2.1 | 144.5/2.0 | 100.0/1.8 | 11.6/1.2 | 4.0/1.1 | 2.5/1.1 |
| 0.025 | --/6.7 | --/6.5 | 150.3/2.4 | 148.5/2.2 | 97.3/2.2 | 15.0/1.4 | 5.7/1.4 | 3.3/1.3 |
| 0.030 | --/8.3 | --/6.4 | 150.7/3.8 | 148.1/3.2 | 106.4/2.7 | 23.3/1.9 | 8.1/1.8 | 4.7/1.8 |
| 0.035 | --/8.1 | --/6.0 | 151.4/3.9 | 147.5/3.5 | 107.9/3.3 | 17.7/2.2 | 8.7/2.2 | 5.4/2.2 |

SYSTEMS AND METHODS FOR ROBUST AND ACCURATE RELATIVE NAVIGATION

CROSS-REFERENCED APPLICATIONS

This application claims priority to U.S. Provisional Application Ser. No. 62/887,924, entitled "CDGNSS Fusion With Other Sensors For Robust And Accurate Relative Navigation" by Vincenzo Capuano et al., filed on Aug. 16, 2019, the disclosure of which is included herein by reference in its entirety.

STATEMENT OF FEDERAL FUNDING

The invention described herein was made with government support under Grant No. 80NM0018D004 awarded by NASA (JPL). The Government has certain rights in the invention.

FIELD OF THE INVENTION

The present invention generally relates to navigation systems and more specifically systems and methods for determining the location of an object relative to another object using a fusion of sensor data from a variety of sensors.

BACKGROUND

Navigation systems can come in a variety of different architectures for use in any number of different applications including, but not limited to, terrestrial navigation as well as space based navigation. Many traditional systems operate on a baseline navigation system commonly known as Global Navigation Satellite System (GNSS). There are a number of various GNSS systems such as GPS, Russia's Global navigation Satellite System (GLONASS), European Union's Galileo, Chinese Beidou Navigation Satellite System (BDS), Japan's Quasi-Zenith Satellite System (QZSS), India's Indian Regional Navigation Satellite System (IRNSS), and other regional systems. Essentially, GNSS relies on a global network of satellites positioned above the earth that transmit signals to GNSS receivers in a number of different devices which can be used for positioning, navigation, and/or timing.

Navigation systems for spacecraft as well as numerous terrestrial systems often incorporate a GNSS type receiver that can process GNSS signals and decode the necessary data in order estimate a location and operationally navigate and perform its intended mission. GNSS based techniques are successfully utilized for positioning and navigation in Low Earth Orbit (LEO) as well as terrestrial operations. However, traditional techniques often fail to provide robust and accurate navigation in higher orbits, above the GNSS constellation as well as locations in which the GNSS signal is lacking or inadequate.

SUMMARY OF THE INVENTION

Many embodiments are directed to a spacecraft navigation system with two or more spacecraft in relative position with each other and capable of establishing the realtime relative position of each spacecraft within the relative orbital path of the other in order to improve the robustness and accuracy of relative navigation. Each spacecraft can be equipped with at least one GNSS navigational sensor and relative navigation sensor and a data fusion filter. The navigational sensor is capable of receiving a GNSS data set comprising GNSS carrier-phase observations between a navigational GNSS network and the respective spacecraft and the relative navigation sensor generates relative position data between the respective spacecraft. The filter receives data from each of the sensors and combines the data sets to calculate the carrier-phase ambiguity thereby establishing the three-dimensional relative location between each of the respective spacecraft. Additionally, many embodiments utilize a tight coupling of the sensor data in order to improve the overall accuracy, robustness, and realtime calculation of the locations of the respective spacecraft.

Many embodiments may be directed to a navigation system with a first mobile device having a framework forming a body of the mobile device. The navigation system may also have a primary navigation receiver integral with the framework of the mobile device and in signal communication with a global navigation satellite system such that the primary navigation receiver is configured to receive a navigational data set from the global navigation satellite system. A secondary sensor unit integral with the mobile device may be configured to generate relative navigation data related to the relative position between the mobile device and an object within a navigational space of the mobile device. Additionally, a processing unit integral with the mobile device may be configured to receive the navigational data set from the primary navigational receiver as well as the measurement data from the at least one secondary sensor unit, wherein the processing unit is configured to utilize the measurement data from the secondary sensor in a fusion process to resolve an integer ambiguity formed form the navigational data set.

In other embodiments, the global navigation satellite system is selected from a group consisting of GPS, GLONASS, BDS, Galileo, QZSS, and IRNSS.

In still other embodiments, the mobile device is a satellite.

In yet other embodiments, the satellite is selected from a group consisting of a microsatellite, a nanosatellite, and a cubesat.

In still yet other embodiments, the object within the navigational space of the first mobile device is a second mobile device comprising a second navigation receiver in signal communication with the global navigation satellite system such that the second navigation receiver receives a second navigation data set respective to the position of the second mobile device and wherein the second mobile device has at least one alternate sensor configured to generate an additional relative navigation data set relative to the first mobile device, and wherein the second mobile device comprises an integral processing component configured to process the second navigation data set and the additional relative navigation data in a tightly fused data processing calculation and wherein each of the first and second mobile devices maintain relative distance to each other based on the tightly fused calculated data.

In other embodiments, the secondary sensor is a camera.

In still other embodiments, the secondary sensor is a laser measurement system.

In yet other embodiments, the first mobile device further comprises a transmitter configured to transmit data to the second mobile device.

In still yet other embodiments, the second mobile device is a satellite.

In other embodiments, the first mobile device further comprises a control system configured to receive the resolve integer ambiguity and modify a programed trajectory of the first mobile device such that it will maintain relative position with the second mobile device.

In still other embodiments, the fusion process is a tight fusion process in the processing unit where the process has the following steps:

Receiving a raw GNSS signal into the primary receiver;

Receiving a relative measurement data set from the at least one secondary sensor;

Resolving the integer ambiguity using a double differencing calculation such that the GNSS signal is combined with the relative measurement data set in a tightly fused to resolve a set of carrier phase integers; and Using the set of carrier phase integers to determine the relative position of the mobile device.

In yet other embodiments, navigation system has a plurality of secondary sensory units.

In still yet other embodiments, the primary navigation receiver is a GPS receiver, and at least one of the plurality of secondary sensors is a camera, and at least one of the plurality of secondary sensors is a star tracker.

Other embodiments may include a method for solving an integer ambiguity where the method involves the following steps:

Receiving a raw GNSS signal into the primary receiver;

Receiving a relative measurement data set from the at least one secondary sensor; and Resolving the integer ambiguity using a double differencing calculation such that the GNSS signal is combined with the relative measurement data set in a tightly fused to resolve a set of carrier phase integers.

In other embodiments, the method may involve establishing a relative position using the resolved integer ambiguity from the processing unit of a first GNSS receiver device.

In still other embodiments, the method may involve establishing a relative position of a second GNSS receiver device in relation to the first GNSS receiver device.

In yet other embodiments, the method may involve establishing a relative position with respect to a GNSS constellation.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein:

FIGS. 2A and 2B illustrate the effect of relative geometry between a receiver and a GNSS transmitter with respect to position accuracy as is known in the art.

FIG. 3 illustrates relative receiver characteristics in accordance with embodiments of the invention.

FIG. 4 illustrates signal tracking configurations in accordance with embodiments of the invention.

FIG. 11 is a tabular format of resolution data for a given time point in accordance with embodiments of the invention.

FIG. 12 is a tabular format of resolution data over time for varying number of satellites in accordance with embodiments of the invention.

FIG. 13 illustrates the potential effects on the probability of a successful ambiguity resolution from a changing field of view of a camera in accordance with embodiments of the invention.

FIG. 14 illustrates the relative recovery time in accordance with embodiments of the invention.

DETAILED DESCRIPTION

Figure 1A:
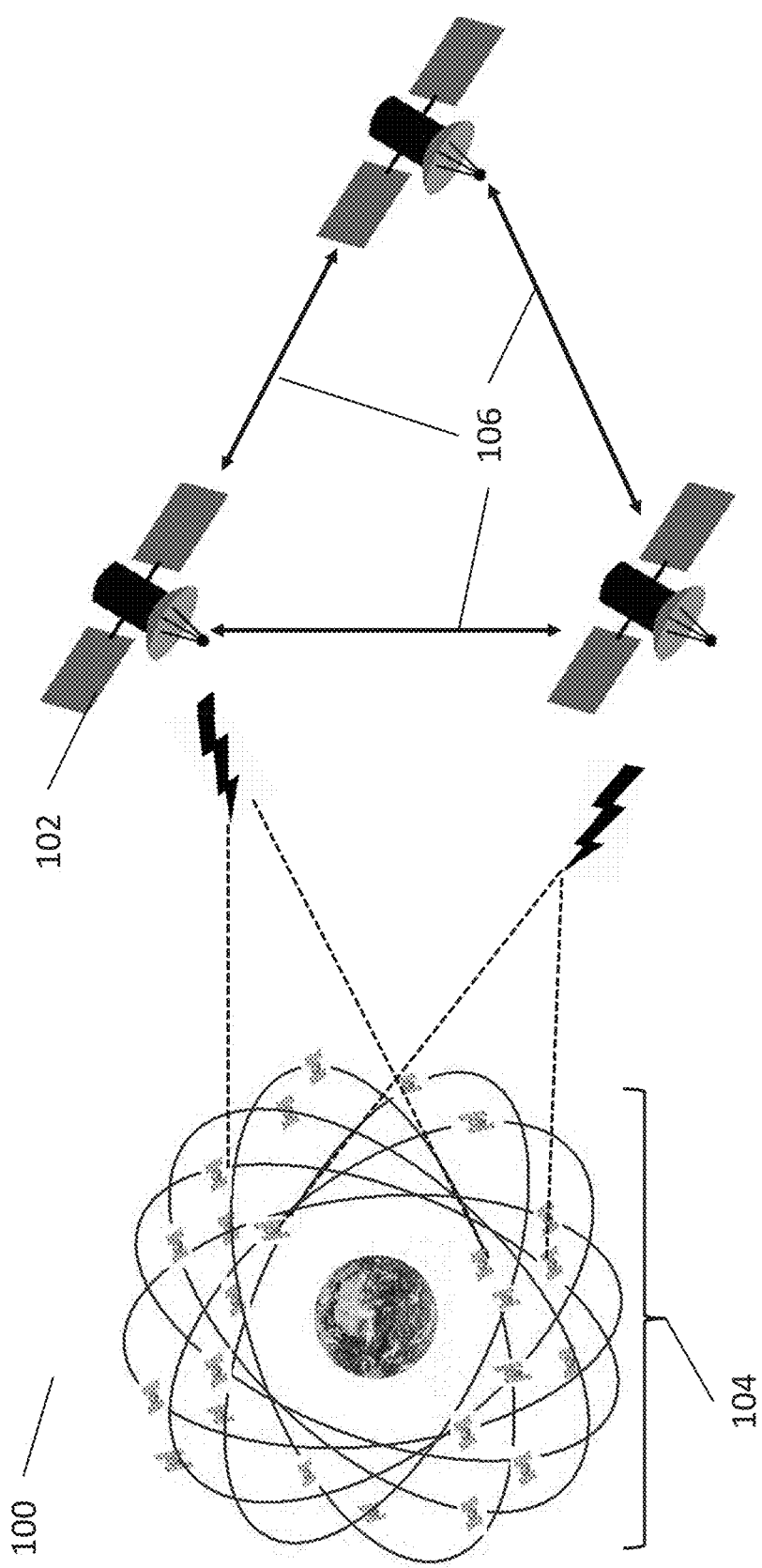
FIG. 1A illustrates a space based navigation system of satellites in orbit in accordance with embodiments of the invention.

Turning now to the drawings, systems and methods for calculating the relative position of a device, such as a satellite, with respect to another object or device using a fusion of GNSS data and additional sensor data in accordance with many embodiments are illustrated. For example, many embodiments include a system of mobile devices each with a GNSS receiver as well as at least one additional sensor. The GNSS receiver for each device can receive a navigation signal from the visible transmitters of the GNSS constellation and measures the carrier phase to calculate the distance from the same transmitters. In several embodiments, an integer number ambiguity, or an unknown number of carrier phase wavelengths between the receiver and the GNSS transmitter exists. In some embodiments, the integer ambiguity is double differenced carrier phase integer ambiguity for which a resolution would result in an accurate and robust relative navigation of a device. In many embodiments, sensor data from one or more additional sensors can be incorporated into a tightly fused data processing calculation in which the double differenced carrier-phase integer number ambiguity can be resolved. By utilizing a tightly fused data processing calculation an accurate determination of the relative distance between the device and the other object can be made in a shorter amount of time and to a higher level of accuracy than traditional methods. Accordingly, such distance calculation can then be used by a number of control systems and measures to appropriately maneuver the device in a path that would maintain relative position with respect to other devices. Similarly, processes similar to those described herein can be used to determine the relative distance between two moving objects such as two orbiting satellites. In this way, real time tracking and relative navigation of numerous satellites can be performed to enable the various satellites to maintain relative position with respect to each other, especially when operating in close proximity to other devices. For example, some embodiments may utilize a number of satellites or devices in formation.

In numerous embodiments, methods for calculating or determining the relative distance between two devices can be used in a variety of situations including but not limited to high earth orbit where GNSS signal degradation is likely. Additional embodiments can operate in areas in which the GNSS signal is excellent where more traditional calculation methods have been used. Even when excellent GNSS signals are available, systems and methods in accordance with various embodiments of the invention can operate with fused sensor data to resolve the carrier phase ambiguity faster than similar calculations can be performed using traditional methods.

Furthermore, navigational systems, in accordance with many embodiments of the invention can be utilized within terrestrial systems. For example, in many embodiments a terrestrial mobile device can be equipped to receive a GNSS signal and may be operating in an area where the GNSS signal is degraded such as an urban environment. The terrestrial mobile device can receive a GNSS signal that may be degraded thus preventing the device from accurately determining its location within the navigational space and its relative position with respect to objects in that space. Accordingly, many embodiments may utilize a combination of alternate sensor data and the GNSS signal in a tightly fused data processing to resolve the carrier-phase ambiguity of the device.

The term mobile device as described herein can refer to any mobile device such as terrestrial devices as well as spacecraft. Spacecraft can refer to any device capable of operation in space that may include, but are not limited to autonomous spacecraft as well as manned spacecraft.

Navigation Systems

Navigation systems can be comprised of a number of different components that receive and/or transmit data. Generally the systems utilize a constellation of GNSS satellites that transmit navigation data to a number of receivers that correspond to a device such as a satellite or a terrestrial mobile device. In some conditions mobile devices, such as satellites, can be designed to operate autonomously and would require the capability of autonomous pose estimation of nearby objects such as other devices, debris, or structures, which generally means determining the position and orientation. For example, autonomous pose estimation of nearby orbiting objects is a key capability for space missions such as on-orbit servicing, on-orbit assembly, active debris removal, formation flying, and/or the autonomous control of swarms of spacecraft.

In most cases, pose estimation is directly performed in real-time in order to enable autonomous relative navigation during close proximity operations, which are otherwise infeasible when based on ground-in-the-loop commands. This is largely due to communication delays and lack of coverage or lack of adequate signal. Several technologies can be used for autonomous pose estimation, depending on the operational environment, characteristics of the orbiting object, and/or on-board resources. Some systems may use sensors such as cameras, lasers, or ultrasonic range finders, in the case of terrestrial devices, to perform pose estimation of nearby objects.

In some systems, an orbiting target spacecraft or other mobile device can be actively cooperative, e.g. equipped with a navigational receiver such as a GNSS and a communication link or an RF transmitting and receiving antenna or antenna array. Accordingly, GNSS or RF based relative navigation can be a very accurate solution for spacecraft navigation in LEO. GNSS carrier-phase range observations can be used to achieve up to millimeter accurate ranges over the standard meter accurate code-phase range observations, however, carrier-phase integer ambiguities typically must be resolved in order to achieve such accuracy. Millimeter level accuracy has been achieved for relative positioning in Low Earth Orbit (LEO) missions by filtering GPS carrier phase measurements in post-processing or loosely fusing GNSS signal data (resolved ambiguities) with a model of the relative dynamics. For example, in traditional systems loose fusion might occur when a GNSS receiver receives and then processes the GNSS data in order to resolve the integer ambiguities. This is done without consideration of any alternative measurement data. Once resolved, many traditional systems will then utilize additional measurement data to derive a more accurate position of the device. However, multipath (self-induced or induced by the other satellite), limited on-board computational resources, and/or imperfect knowledge of the spacecraft attitudes can reduce the accuracy achievable in real time to the centimeter or decimeter level. The highest accuracy can be reached only in a fixed solution. In other words, it can only be reached once the exact integer number of radio wavelengths between the GNSS transmitters and the receiver has been calculated. This is often referred to as the integer ambiguity and generally requires signal data processing in order to determine the number of wavelengths. Once the number of wavelengths is determined the relative distance between the spacecraft and another object can be realized. However, such signal data processing can be generally slow for real-time pose estimation.

Additionally, a low number of available GNSS satellites, low signal-to-noise-ratio (SNR), and/or poor receiver/transmitter relative geometry can prevent a fixed solution, only allowing a less accurate float solution, or non-integer ambiguity, often requiring more than five satellites to achieve an accurate result. Therefore, performance and robustness can drastically decrease in situations with signal degradation and other interferences as can often occur at higher earth orbits above the GNSS constellations or during terrestrial operation in which there may be signal interference or occlusion. Alternatively, some systems have implemented other sensors, such as monocular vision sensors as a way to provide relative navigation in a loosely fused dataset. However, such sensors typically offer lower accuracy than GNSS, particularly for larger baselines and wider fields of view. Furthermore, the implementation of the augmented sensors is often used in a loose integration of data. In other words, the additional sensor data is only utilized after the total integer number of wavelengths is determined. This often results in delayed estimations that could be costly in any real time scenario.

In contrast, many embodiments may resolve a double differenced integer ambiguity using a tightly fused data processing calculation. For example, a GNSS receiver can receive GNSS data which will naturally have carrier phase integer ambiguities and numerous embodiments may utilize additional raw data from alternate sensors for each of the integer ambiguity points to reduce the search space for solving the integer ambiguities. Furthermore, as a fixed set of potential solutions has been established, many embodiments may utilize the alternate sensor or relative navigation data in a subsequent calculation to further refine the resolution and derive accurate position data for a given device.

Figure 1B:
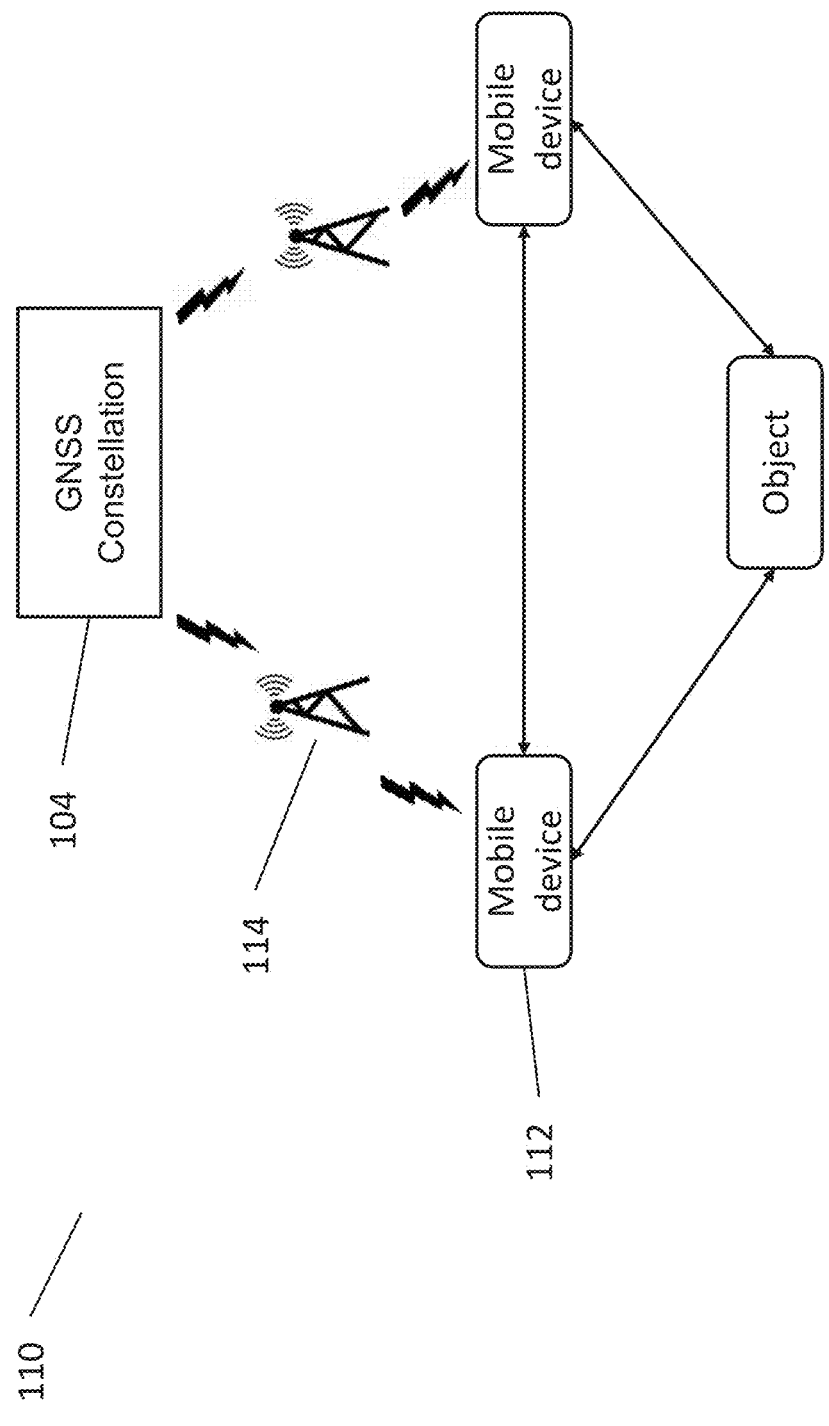
FIG. 1B illustrates a ground based navigation system of mobile devices in accordance with embodiments of the invention.

Turning now to FIGS. 1A and 1B examples of space based (1A) and terrestrial (1B) navigation system are illustrated. In a space based system 100 as illustrated in FIG. 1A, a number of different satellites 102 are receiving a GNSS signal from satellites within a GNSS constellation 104. Additionally, each of the satellites 102 can be in communication 106 with the other satellites operating at different locations. As can be appreciated, the position of the satellites 102 can be any distance from the constellation 104. Given that each of the satellites would have their own position relative to the constellation 104 it can be understood that each satellite 102 can have a different level of GNSS signal reception that can range from excellent, when closer to the constellation 104, to poor the further the distance from the constellation 104. Additionally, it should be reasonably understood that each of the satellites can be in signal communication with each other by a number of different methods using any number of different sensors including (but not limited to) vision sensors such as cameras.

Similar to FIG. 1A, FIG. 1B illustrates a ground based navigation system 110. Many devices within the ground based navigation system operate on similar principles as those in a space based system 100. For example, mobile devices 112 can be in signal communication with a GNSS constellation 104 similar, if not the same, as the space based system 100. Some terrestrial systems can augment GNSS signals through the use of ground based wireless transmission systems 114 that may help to extend or transmit the GNSS signal to the terrestrial based devices 112. Additionally, it may be possible for the terrestrial devices 112 to provide additional data regarding ground based objects such as buildings and other geographical features. This can be done in any number of ways such as cameras or other sensors internal to the ground based device 112. For example, some ground based devices 112, such as hand held devices can have altimeters and accelerometers that can be used to generate additional data with respect to the relative position of the ground based device 112.

Terrestrial and space based systems can operate using the same principles of operation and communication to determine the level of GNSS signal that is present for determining the relative position of various devices. For example, FIGS. 2B and 2C illustrate how the position of the device or receiver with respect to the GNSS constellation can determine the level of certainty of the position of the device. FIG. 2A illustrates a receiver 202 in communication with a number of different satellites 204 that form part of a GNSS constellation 206. The receiver is only capable of receiving signals from a few satellites 204 that are visible. For example, some satellites 204 may be obstructed from view and in other scenarios the satellites may be too far away, such as in the case of a very high orbit. Accordingly, the level of certainty of the estimated location of the receiver is low, because of the biased signal illustrated by the low angles between the lines of communication 208. The right figures of 2A and 2B further illustrate the level of uncertainty. FIG. 2B the satellites 214 are located at a certain angle with respect to the user position. The top (FIG. 2A) the angle between the transmitters, as viewed from the receiver is smaller. In both cases, the errors on range are the same, but the position error, which is illustrate by the shaded portion 210 is larger.

GNSS Receiver and Signals

GNSS signals can be referred to in alphanumeric terms such as L1 and L5 offering a number of different frequencies and/or signals that receivers can use to perform navigation. The various signals can be used for a number of different applications including military and/or civilian applications. GNSS signals are also typically processed in a number of different ways. For example, traditional methods use pseudocode estimation that may only result in a meter level of accuracy. However, many embodiments described herein can operate on a more accurate level, in the millimeter range, for example, by using carrier phase estimation. The phase of a signal can be associated with a signal wavelength that can translate to a distance measurement between a GNSS system and a mobile device, such as a satellite. Additionally, this distance can be used in determining the relative location of a receiver. However, carrier phase estimation can create ambiguities or uncertainties in the actual number of wavelengths that exist in the signal. As such, resolving ambiguities can assist in determining accurate measurement data for use in the receiver. As previously discussed, this is often time consuming and may not serve well for real-time tracking. However, numerous embodiments can utilize a tight coupling of carrier phase observation data with alternate sensor or relative navigation data to rapidly resolve carrier phase ambiguities from GNSS signals and determine the relative position of the receiver. Furthermore, many embodiments may utilize double differenced ambiguity correction in a tightly fused calculation with alternate sensor or relative navigation data to resolve the carrier phase ambiguities.

In many embodiments, the navigation system may utilize any number of GNSS receivers that are capable of processing GNSS signals and/or maintaining phase locking with GNSS systems. For example, navigation systems may be able to process signals down to 20 dB-Hz. This level can be capable of tracking multiple GNSS signals within various positions in relation to a GNSS constellation. In other embodiments, the navigation system may be capable of achieving a higher level of sensitivity with signals down to 15 dB-Hz. FIG. 3 illustrates an example of receiver characteristic data that can be used in numerous embodiments. Ultimately, some embodiments may be capable of tracking all types of GNSS signals such as L1C/A and L5Q to name a few. Using L5 signals for instance, can be advantageous because their power is slightly higher and their chipping rate is higher. Thus, yielding a lower tracking noise jitter for weak signal conditions. The table in FIG. 4 illustrates signal tracking configuration in accordance with some embodiments. It can be seen that relative navigation tracking L1 C/A signals can be done using carrier phase observations.

Figure 5:
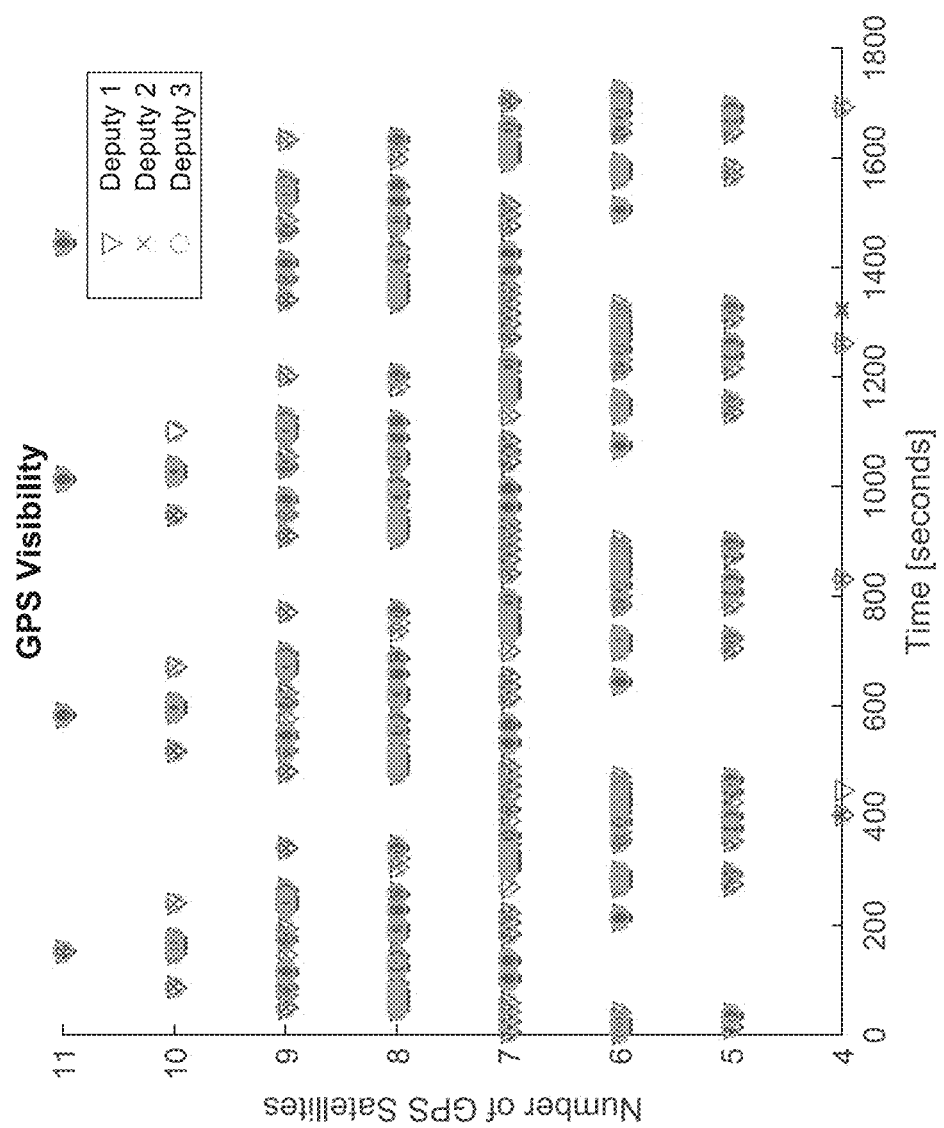
FIG. 5 illustrates various visibilities for numerous space vehicles in formation in accordance with embodiments of the invention.

In numerous embodiments, the various devices in communication, similar to those illustrated in FIG. 1A, can have degraded GNSS signals which alter the GNSS visibility. For example FIG. 5 illustrates GNSS visibility data from three space vehicles in formation, orbiting in proximity of a geostationary satellite, in a GNSS degraded environment. The results illustrated assumed receivers tracking GNSS signals from side lobes up to 37 degrees of azimuth and elevation from the antenna boresight. Because the vehicles are orbiting around the geostationary satellite, their visibility can be limited because many signals come from side lobes of the GNSS transmitters or because the line of sight may be obstructed from another satellite or by the geostationary satellite. Such data is a primary example of a GNSS degraded environment for which many embodiments are capable of resolving the integer ambiguity where traditional methods may fail.

Alternate Sensor Data

Figure 6:
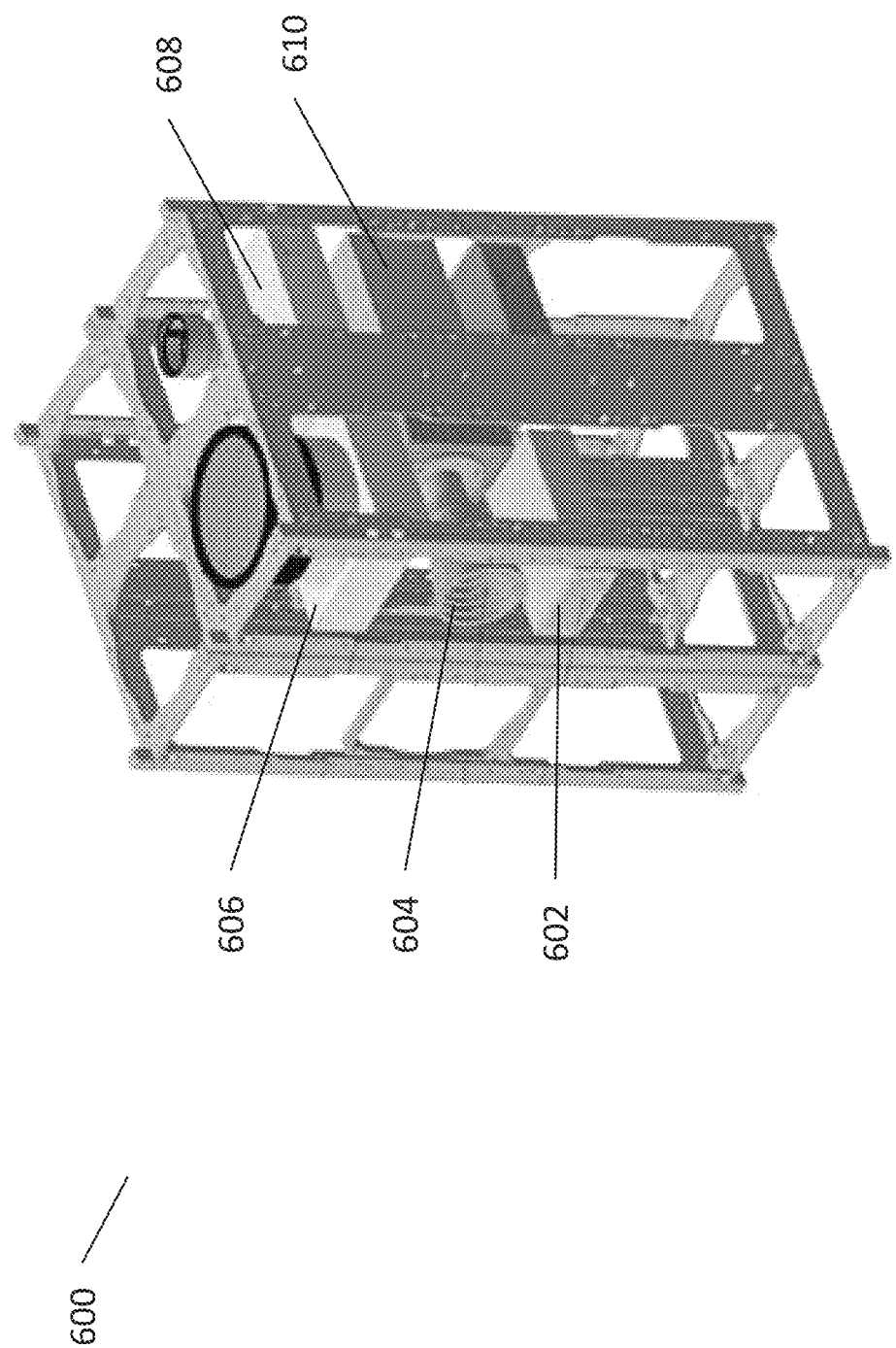
FIG. 6 illustrates a cubesat device in accordance with embodiments of the invention.

As previously discussed, pose estimation can be an integral component in some embodiments in order to accelerate the resolution of the carrier phase ambiguity. Different pose estimation approaches can be used in order to gather relative attitude and position of a target body (object) using different metrology systems and sensors. As can be appreciated, any object can have a number of different features that can help determine the relative size and shape of the object. For example, FIG. 6. Illustrates a Cubesat, in accordance with embodiments of the invention, which may be configured with a GNSS receiver and a host of other subsystems in order to perform the relative functions of the mission including, but not limited to relative navigation with respect to other objects such as other Cubesats. Accordingly, the Cubesat design in conjunction with the onboard components, can have relatively distinctive features that could be used to determine the relative position to the device with respect to other objects or devices. Additionally, the various components of the device can affect the ability for the receiver to accurately receive GNSS signal data. For example, in some embodiments a satellite 600 can be equipped with a GNSS receiver and antenna 602 as well as a star tracker 604 and one or more additional cameras 606 and 608. Accordingly, satellite configurations may be modular in some respects allowing the various components to be positioned in such a way that the satellite can maintain the best possible connection with a GNSS system. Satellites, in general, can also have other components that can create interference with the GNSS signals at the receiver antenna. Therefore the position of the receiver antenna can be important in establishing an acceptable GNSS signal. Receivers can have a processing unit 610 that can be used in the processing of GNSS and sensor data. Accordingly, the various components that can be incorporated into receivers in accordance with numerous embodiments of the invention can affect the overall structure by creating alternate points of reference which can be difficult to accurately determine in low light or low visibility settings. Although a Cubesat design is illustrated in FIG. 6, it should be understood that any number of satellites may be adapted with the necessary components to receive GNSS signals as well as perform relative navigation with respect to other objects or devices. For example, other embodiments may include micro-satellites, nano-satellites, or any combination of said devices.

Figure 7:
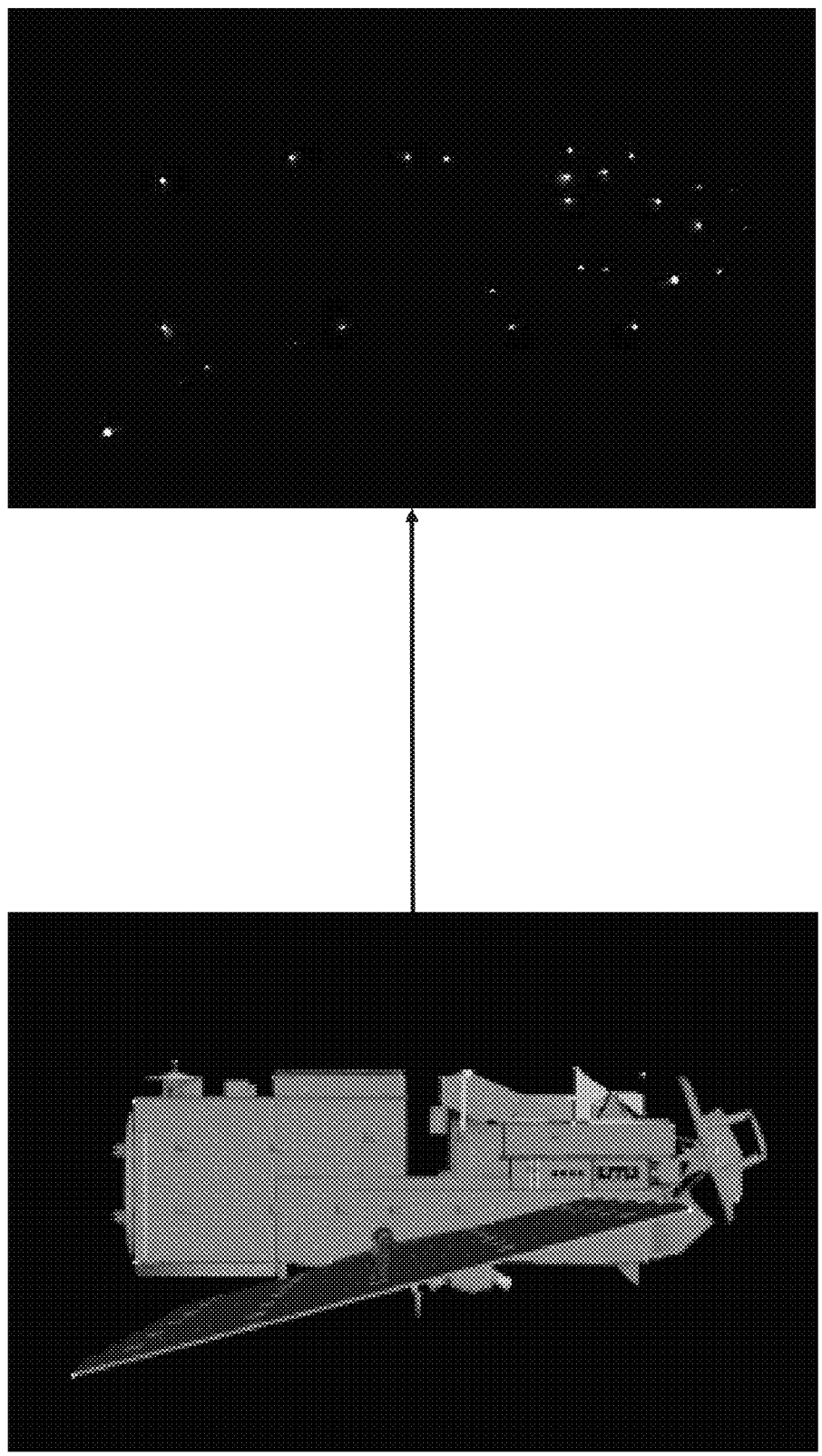
FIGS. 7 and 8 illustrates relative view (left) and extracted feature points (right) of satellites as seen from an onboard camera system in accordance with embodiments of the invention.
Figure 8:
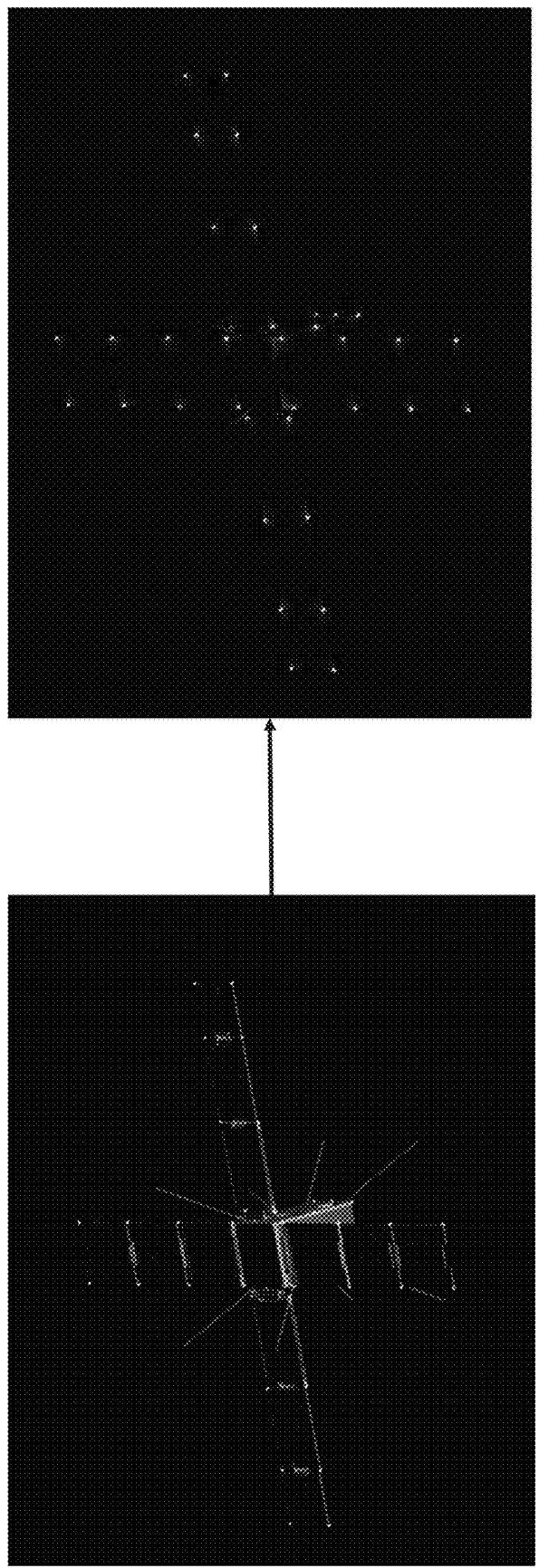

In some embodiments, devices can be equipped with artificial markers and an RF transmitter. The artificial markers can be in the form of LED lights placed at key locations on the external portion of the device. The artificial markers can aid in identifying the object. For example, in different operating conditions a vision sensor may miss key features of a device that could produce an incorrect estimate of the geometry of the device and potentially affect the processing of the GNSS data in the resolution of carrier phase ambiguities. For example, FIGS. 7 and 8 illustrate models of spacecraft equipped with LED markers on their exterior surfaces. Accordingly, it can be seen that relative geometry of the device can be determined with a number of artificial markers in low light conditions. It can be appreciated, that any number of sensors can be used to establish the relative marker positions. For example, image sensors such as cameras or laser sensors can be used to generate image data of the relative device geometries. Furthermore, receivers in accordance with some embodiments of the invention can be calibrated to determine the relative geometry of the object or device using any number of tracker or device that can be tracked or seen in low light conditions such as (but not limited to) reflective IR devices.

In many embodiments, the two dimensional coordinates of the markers or key geometric points on the respective devices can first be established. In some embodiments with LED markers the respective devices can be time synced such that image data can be generated with alternating on and off sequences of the markers. This can provide better contrast with the background and thus help to produce a more accurate location of the markers. Accordingly, the 2D data can be used in conjunction with known data from other sensors to accurately establish a set of three dimensional data points for each of the respective devices. Knowing the three dimensional data of an object or device can help to establish the respective attitude and velocity vectors that can ultimately be used to alter the trajectory of an oncoming device to maintain a relative position with the device. Although various space based devices are illustrated, it should be understood that similar calculations and data extractions can be performed using ground based systems such as (but not limited to) drones and/or other ground based systems.

Batch Filter Processing

In accordance with numerous embodiments, the data gathered from both the GNSS receivers as well as additional sensor(s), including image sensors, can be tightly coupled or fused in a manner in which the carrier phase integer ambiguities can be quickly resolved for use in measurement tracking and/or navigation. In many embodiments, a processing method can be used that tightly couples batches of data from devices over a period of time. Various embodiments may be improved with devices that are capable of maintaining phase lock between devices. For example, when two separate satellites are capable of generating output signals related to or locked with the input signals from the respective satellite they can maintain a phase lock. Some embodiments may be capable of coupling data sets without phase lock. In other embodiments, if the phase lock is lost and then reestablished, a new constant integer ambiguity can be calculated and treated as a new variable.

In accordance with many embodiments, the data processing can occur in a batch filtering process that solves for the change in position of a device over time and can solve double different carrier phase integer ambiguities using tightly coupled data. In numerous embodiments the double difference measurements can be represented by equation (1) below:

$$\lambda_{L1}\nabla\Delta(\phi)_{AB}^{j1}=\nabla\Delta(\rho)_{AB}^{j1}+\lambda_{L1}\nabla\Delta(N)_{AB}^{j1}+\nabla\Delta(w)_{AB}^{j1} \quad \text{Eq. 1}$$

where j refers to the respective transmitter and A and B refer to the respective receivers of the satellites. Additionally, $w_A^{i,t}$ is defined as the double difference carrier phase measurement error. This generally refers to how GNSS data can be characterized when received by the device for iterative processing.

In accordance with numerous embodiments, a sensor can generation additional observation data from each of the respective devices. The additional observation data, in many embodiments, can be characterized by equation (2) below:

$$O_B^{k,t}=P_B(T_A^{B,t}(P_A^k))+\varepsilon_B^{k,t} \quad \text{Eq. 2}$$

where $P_B$ is the projector operator for device B's linear observation. The observation of marker k of device A at time t in B's camera is $O_B^k$. The value $\varepsilon_B^{k,t}$ is the point observation localization error. Similar measurements can be taken for $O_A^{k,t}$ for device A.

In other embodiments, an additional constraints on the relative positions can be used following code-based pseudorange measurements illustrated in equation (3) below.

$$\nabla\Delta(P)_{AB}^{j1}=\nabla\Delta(\rho)_{AB}^{j1}+\nabla\Delta(\nu)_{AB}^{j1} \quad \text{Eq. 3}$$

For each variable in the above referenced equations priors such as $x_A^t$ from an absolute filter or $\widetilde{\Delta x}^t$ from a relative filter can be utilized. Additionally, some embodiments may utilize floating solutions for $\nabla\Delta(N)_{AB}^{ji}$ as $\widetilde{\nabla\Delta N}_{AB}^{j1}$ along with resulting marginal covariances from previous solutions to ultimately improve the overall response time and accuracy of the solution.

Figure 9:
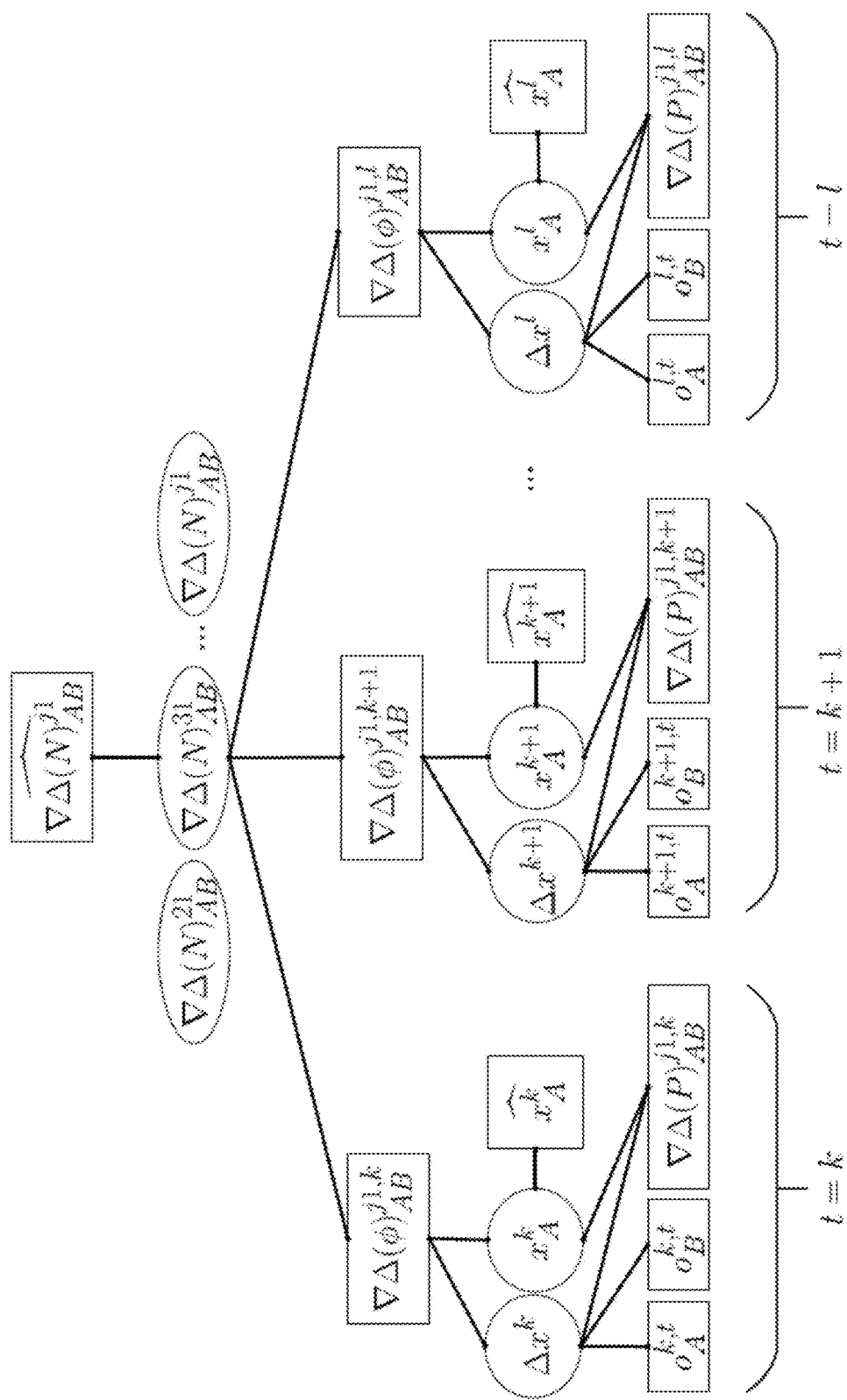
FIG. 9 illustrates a factor graph architecture for use in resolving the integer ambiguities of GNSS signals in accordance with embodiments of the invention.

As can be appreciated from the complexity of variables and data generated from the various sensors, some embodiments may utilize an iterative solution process in order to resolve the carrier phase integer ambiguities. In some embodiments, a sparse linear equation can be obtained from the least square problem obtained from a factor graph similar to that illustrated in FIG. 9. The sparse linear equation can be illustrated by equation 4:

$$A\Delta y = b \qquad \text{Eq. 4}$$

where A is determined by the Jacobian and covariances of measurements and b is determined by the residuals and covariances and where equation 5 is illustrated by:

$$y = \begin{bmatrix} x^t \\ \Delta x^t \\ \nabla\Delta(N)_{AB}^{j1} \end{bmatrix}. \qquad \text{Eq. 5}$$

This can be approximated as a linear regression problem with normal noise. Ultimately the resolution of the carrier phase integer ambiguities can be solved for $\nabla\Delta(N)_{AB}^{j1}$. After solving for $\nabla\Delta(N)_{AB}^{j1}$ corrections to the integer terms can be made and then used in subsequent batches to improve the overall accuracy of the measurements.

In numerous embodiments, additional process filters can be used in conjunction with the batch fusion filter process described above. For example, some embodiments can utilize and adaptive orbital filter to provide an accurate absolute state estimate which can include chaser (first device) position, velocity vector, as well as receiver clock bias and drift. In some embodiments, the velocity vector can be determined in the Earth Centered Inertial Frame (ECI). Accordingly, many embodiments can utilize the equation below to determine the absolute position and velocity vectors of the device in ECI:

$$a(r,t) = a_g(r,t) + a_s(r,t) + a_m(r,t) + a_{srp}(r,t) + a_r(r,t) \qquad \text{Eq. 6}$$

where r represents the position vector and t is the dynamical time, a is the total acceleration, $a_g$ is the acceleration due to earth's gravity, $a_s$ is the acceleration due to the sun, $a_m$ is the acceleration due to the mood, and $a_{srp}$ is the acceleration due to the solar radiation pressure. As can be appreciated the filter can make use of an adaptive tuning of the covariance matrix of measurement, as a function of the pseudorange and pseudorange rate predicted errors, a function of the carrier to noise ratio of the processed signals and the receiver position.

Other embodiments can implement a relative navigation filter that makes use of the relative translational dynamics between a chaser device and a target device. This can be used in numerous embodiments to refine the relative position estimate of the batch filter process described previously and can do so at an increased rate. In some embodiments, the relative navigation filter can minimize the worst case estimation error without any assumptions on the probability of distribution of the system and measurement noise. Therefore, it can better handle modeling errors and noise uncertainty resulting in a more robust process, especially in the processing of optical measurements from variable illumination conditions.

System Architecture

Figure 10:
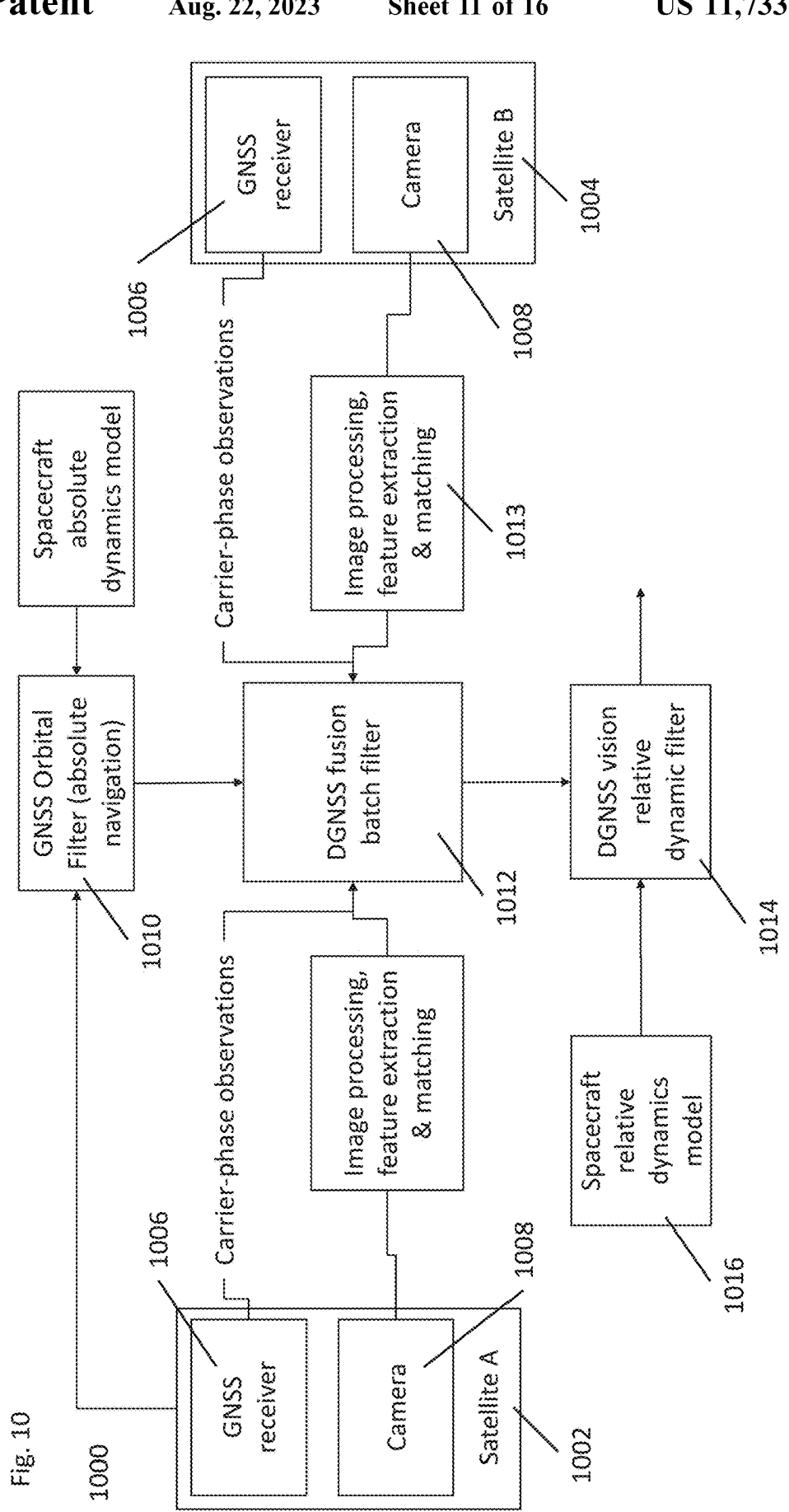
FIG. 10 illustrates a system architecture in accordance with embodiments of the invention.

In accordance with numerous embodiments, the various receivers, sensors, and processors can be implemented into a system architecture similar to that illustrated in FIG. 10. In many embodiments a system architecture 1000 can have two coordinating devices 1002 and 1004 that can be satellites. Each of the coordinating devices (1002 & 1004) can be configured with at least a GNSS receiver 1006 and at least one additional sensor 1008. In many embodiments, the additional sensor 1008 can be an onboard camera or may be a laser finding sensor or may be any other type of sensor that is capable of capturing a distance measurement or relative navigation data of one or more points on a coordinating device. In accordance with numerous embodiments, the coordinating devices can have onboard orbital filters 1010. The onboard orbital filters 1010 can use GNSS code observations to generate the absolute kinematic state of the respective device. The absolute kinematic state in either device can be used as prior data in a batch filter processor 1012 where the batch filter processor receives carrier phase observations (related to the ambiguities) as well as the raw measurement data from the additional sensors 1008. Various system architectures may utilize a partial processing of image or relative navigation data 1013 to generate or extract relative feature data for further calculation in the batch filter processor in various embodiments. In accordance with many embodiments, the batch filter processor can fuse the raw data at a low level of processing such that the data is tightly fused. This can be done in such a manner that carrier phase integer ambiguities can be resolved at a low level and refined through subsequent calculation and further fusing of data. Accordingly, the tight fusion of data can result in a faster and more resolution of the carrier phase integer ambiguities.

As previously described additional filters such as the orbital filter 1010 can be implemented within the system architecture in order to further refine the relative measurement results produced form the tightly coupled batch filter process. For example, some embodiments may further implement a relative dynamic filter 1014 that incorporates device dynamics 1016 in a manner so as to refine the relative position generated from the batch filter 1012. Accordingly, many output results can demonstrate improved resolution over traditional methods.

FIGS. 11 through 14 are tabular representations of test data that illustrate the capabilities of a batch filter process that tightly fuses GNSS data and additional sensor data. In some embodiments the additional sensor data can be referred to as vision data. It can be reasonably understood that vision data can be alternative measurement data including, but not limited to, camera sensor data.

FIG. 11 illustrates the results of utilizing tightly coupled data to recover the carrier phase integer ambiguities in a single time step using only 5 available satellites from the GNSS constellation and is represented in a percentage of resolution. $\sigma_\Theta$ represents the carrier phase noise and is represented from a minimum value to a maximum value. It can be illustrated that the fusion of GNSS data and vision data generated a more accurate resolution of the integer ambiguity for all noise levels at the given time stamp.

FIG. 12 illustrates how likely the tightly fused data processing is to recover the integer ambiguity over a given time span and satellite count for different batch sizes. In FIG. 12 the batch size corresponds to 4 seconds. It can be readily illustrated that the tight fusion of GNSS and vision data in accordance with many embodiments is capable of recovering the integer ambiguity much quicker than more traditional systems where only GNSS is used to recover the ambiguity. Additionally, it can be seen that when using GNSS in conjunction with vision or alternate sensor data in a tight pre-processing mode, a high percentage of recovery is achievable with a smaller number of satellites which often correlates to a degraded GNSS signal.

FIG. 13 illustrates the effects of different field of views of a vision camera. The camera can be assumed to see a certain number of reference points or marks such as LED lights. It can be seen that the GNSS and vision tightly fused data is less affected by the increasing field of view despite the recovered vision solution becoming worse. This is explained by the error covariances of the GNSS and vision solutions being complementary due to the relative passive orbit, where the optical axis is approximately perpendicular to the radial vector to the target. FIG. 14 compares the mean recovery time between GNSS only and GNSS-vision coupled system under different satellite counts and carrier phase noises. It can be seen that recovery times for low noise and high satellite counts are similar to other systems. However, it can be expected that at higher altitudes with degraded GNSS single, GNSS only systems will have increased recovery times while GNSS and vision tightly fused systems will maintain fast recovery times.

Figure 15:
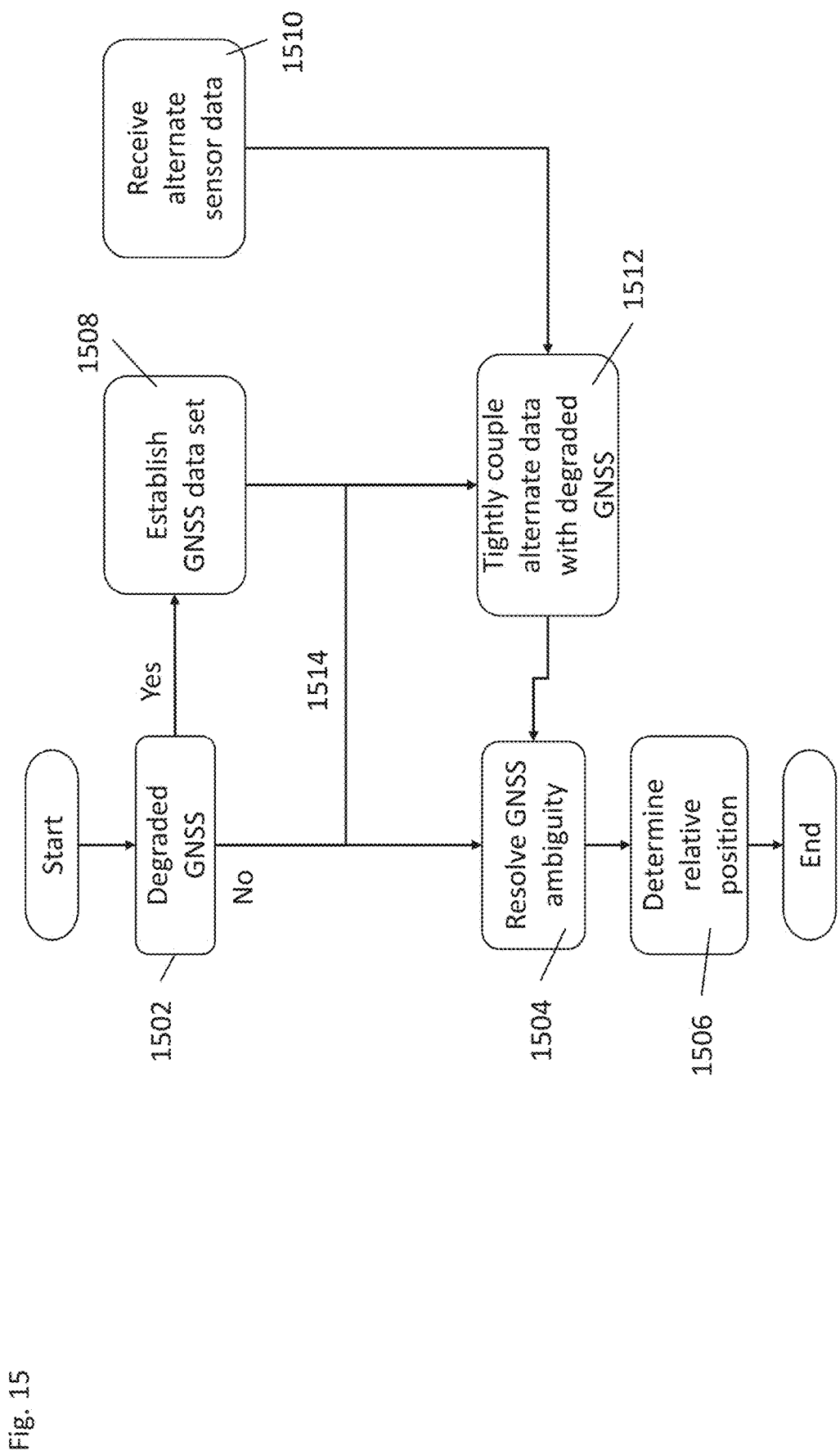
FIG. 15 illustrates a process flow diagram for determining the relative position of a device in accordance with embodiments of the invention.

Turning now to FIG. 15 various process methods for resolving the integer ambiguity according to many embodiments can be illustrated. For example FIG. 15 illustrates a process of determining the relative position of a device. Initially a device must determine the level of degradation or lack thereof of the GNSS signal (1502). If the GNSS signal is good then in some embodiments, the receiver can proceed to resolve the GNSS ambiguity (1504) and determine the relative position of the device (1506). In other embodiments, if the GNSS signal is degraded the receiver can take the GNSS signal data (1508) that is available as well as generate additional sensor data (1510) in a parallel path. Subsequently, a processor can tightly couple or fuse (1512) the data from a degraded GNSS signal that does not have a resolved integer ambiguity and the additional sensor or relative navigation data in order to resolve the integer ambiguity (1504). Alternatively, many embodiments may utilize non-degraded GNSS data, or prior solved integer ambiguity data 1514 to fuse or couple (1512) with the additional sensor or relative navigation data to refine the relative position measurements. Accordingly many embodiments can utilize the resolved ambiguity in order to establish a relative position of the device to other objects or devices in the same navigational space.

Figure 16:
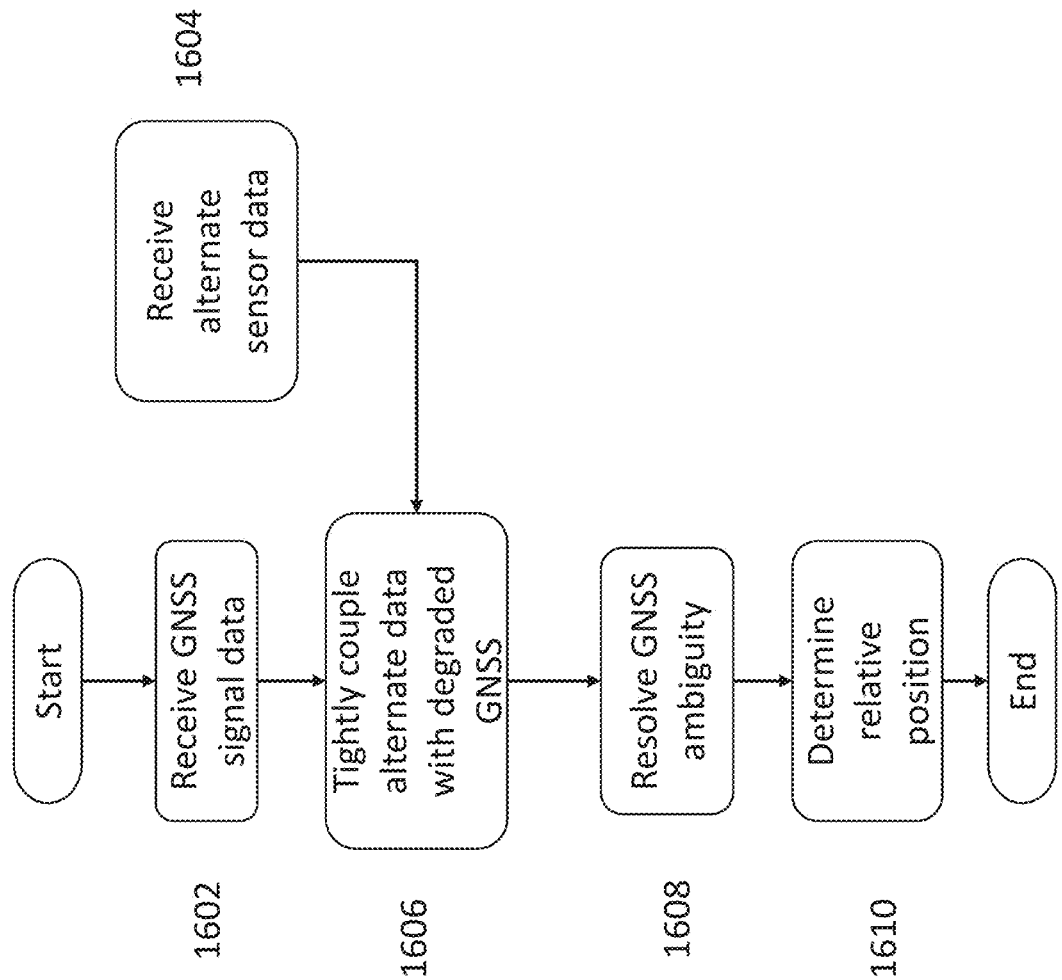
FIG. 16 illustrates a process flow of a method for resolving integer ambiguities in accordance with embodiments of the invention.

In accordance with many embodiments, the relative position of a mobile device can be determined in a manner similar to that illustrated in FIG. 16. For example, a GNSS signal processor can be configured to receive (1602) GNSS signal data in a raw format. Additionally, alternate sensor data can be received (1604) by the processing unit and subsequently coupled or fused (1606) with the GNSS signal data. Accordingly, the fusion of data (1606) can result in a resolution of integer ambiguities related to the GNSS signal data. The integer ambiguities need to be resolved in order for GNSS signal data to be effectively used to determine the relative location (1610) of a respective device to a high level of accuracy. Alternative methods involve the use of pseudorange codes to determine the relative position of a device. However, such methods generally do not provide the level of accuracy that may be required. Furthermore, traditional methods for resolving the ambiguities are not suitable for real-time tracking and movement because of the time it can take to resolve the ambiguity without additional satellites. In contrast, embodiments similar to that illustrated in FIG. 16 are capable of real time resolution of integer ambiguities (1608) without post processing of alternate sensor data.

It can be appreciated that the applications of the tight fusion of GNSS data and vision data can be implemented in a number of different devices. Additionally, although various embodiments illustrate the use of tight data fusion separately from traditional post processing methods, it can appreciated that many embodiments can combine the tight fusion of raw data with post processing methods in order to enhance and refine the relative position data of the devices in the operational space.

SUMMARY & DOCTRINE OF EQUIVALENTS

As can be inferred from the above discussion, the above-mentioned concepts can be implemented in a variety of arrangements in accordance with embodiments of the invention. Specifically, systems and methods for determining the relative position of a mobile device in relation to other devices in the operational space. Many embodiments utilize a tight fusion of raw data from a number of different sensors including, but not limited to, GNSS receivers and camera systems in order to accurately and quickly resolve traditional integer ambiguities that occur with GNSS data signals.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A navigation system comprising:
a first mobile device having a framework forming a body of the mobile device;
a primary navigation receiver integral with the framework of the mobile device and in signal communication with a global navigation satellite system such that the primary navigation receiver is configured to receive a navigational data set from the global navigation satellite system;
at least one secondary sensor unit integral with the mobile device and configured to generate relative navigation data related to the relative position between the mobile device and an object within a navigational space of the mobile device;
a processing unit integral with the mobile device configured to receive the navigational data set from the primary navigational receiver as well as the measurement data from the at least one secondary sensor unit, wherein the processing unit is configured to utilize the measurement data from the secondary sensor in a fusion process to resolve an integer ambiguity formed form the navigational data set, and
wherein the object within the navigational space of the first mobile device is a second mobile device comprising a second navigation receiver in signal communication with the global navigation satellite system such that the second navigation receiver receives a second navigation data set respective to the position of the second mobile device and wherein the second mobile device has at least one alternate sensor configured to generate an additional relative navigation data set relative to the first mobile device, and wherein the second mobile device comprises an integral processing component configured to process the second navigation data set and the additional relative navigation data in a tightly fused data processing calculation and wherein each of the first and second mobile devices maintain relative distance to each other based on the tightly fused calculated data.

2. The navigation system of claim 1, wherein the global navigation satellite system is selected from a group consisting of GPS, GLONASS, BDS, Galileo, QZSS, and IRNSS.

3. The navigation system of claim 1, wherein the mobile device is a satellite.

4. The navigation system of claim 3, wherein the satellite is selected from a group consisting of a microsatellite, a nanosatellite, and a cubesat.

5. The navigation system of claim 1, wherein the secondary sensor is a camera.

6. The navigation system of claim 1, wherein the secondary sensor is a laser measurement system.

7. The navigation system of claim 1, wherein the first mobile device further comprises a transmitter configured to transmit data to the second mobile device.

8. The navigation system of claim 1, wherein the second mobile device is a satellite.

9. The navigation system of claim 1, wherein the first mobile device further comprises a control system configured to receive the resolve integer ambiguity and modify a programmed trajectory of the first mobile device such that it will maintain relative position with the second mobile device.

10. A navigation system comprising:
a first mobile device having a framework forming a body of the mobile device;
a primary navigation receiver integral with the framework of the mobile device and in signal communication with a global navigation satellite system such that the primary navigation receiver is configured to receive a navigational data set from the global navigation satellite system;
at least one secondary sensor unit integral with the mobile device and configured to generate relative navigation data related to the relative position between the mobile device and an object within a navigational space of the mobile device;
a processing unit integral with the mobile device configured to receive the navigational data set from the primary navigational receiver as well as the measurement data from the at least one secondary sensor unit, wherein the processing unit is configured to utilize the measurement data from the secondary sensor in a fusion process to resolve an integer ambiguity formed form the navigational data set, and
wherein the fusion process is a tight fusion process in the processing unit comprising:
receiving a raw GNSS signal into the primary receiver;
receiving a relative measurement data set from the at least one secondary sensor;
resolving the integer ambiguity using a double differencing calculation such that the GNSS signal is combined with the relative measurement data set in a tightly fused to resolve a set of carrier phase integers; and
using the set of carrier phase integers to determine the relative position of the mobile device.

11. The navigation system of claim 1, further comprising a plurality of secondary sensory units.

12. The navigation system of claim 11, wherein the primary navigation receiver is a GPS receiver, and at least one of the plurality of secondary sensors is a camera, and at least one of the plurality of secondary sensors is a star tracker.

13. The navigation system of claim 10, wherein the global navigation satellite system is selected from a group consisting of GPS, GLONASS, BDS, Galileo, QZSS, and IRNSS.

14. The navigation system of claim 10, wherein the mobile device is a satellite.

15. The navigation system of claim 14, wherein the satellite is selected from a group consisting of a microsatellite, a nanosatellite, and a cubesat.

16. The navigation system of claim 10, wherein the secondary sensor is a camera.

17. The navigation system of claim 10, wherein the secondary sensor is a laser measurement system.

18. The navigation system of claim 10, further comprising a plurality of secondary sensory units.

* * * * *